United States Patent
Kim et al.

(10) Patent No.: US 9,699,843 B2
(45) Date of Patent: Jul. 4, 2017

(54) POWER SUPPLY DEVICE FOR LED LIGHT

(71) Applicant: LG INNOTEK CO., LTD., Seoul (KR)

(72) Inventors: Sang Beom Kim, Seoul (KR); Joo Hoon Kim, Seoul (KR); Dong Yeol Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/134,902

(22) Filed: Apr. 21, 2016

(65) Prior Publication Data
US 2016/0316532 A1    Oct. 27, 2016

(30) Foreign Application Priority Data
Apr. 21, 2015  (KR) .................. 10-2015-0056087

(51) Int. Cl.
*H05B 37/00*   (2006.01)
*H05B 33/08*   (2006.01)

(52) U.S. Cl.
CPC ..... *H05B 33/0815* (2013.01); *H05B 33/0845* (2013.01)

(58) Field of Classification Search
CPC ................ H05B 33/0815; H05B 33/0845
USPC ................ 315/201, 210, 247, 294, 297, 307
See application file for complete search history.

(56) References Cited

U.S. PATENT DOCUMENTS

2012/0212143 A1*  8/2012  Esaki ............. H05B 33/089
                                                    315/192
2014/0049173 A1*  2/2014  Le ............... H05B 33/0815
                                                    315/200 R

* cited by examiner

*Primary Examiner* — Daniel D Chang
(74) *Attorney, Agent, or Firm* — Saliwanchik, Lloyd & Eisenschenk

(57) ABSTRACT

Disclosed herein is a power supply device for an LED light. The power supply device for an LED light includes a power supply unit for converting input power and providing the converted power to LEDs and a central control unit for controlling an operation of the power supply unit. The power supply unit includes a switching circuit electrically connected to both ends of the LEDs, a switching control circuit configured to control the ON/OFF of the switching circuit, and a dimming control circuit configured to control the amount of power supplied by the power supply unit in response to the ON/OFF of the switching circuit and a dimming control signal received from the central control unit, and the central control unit provides a switching control signal for controlling the switching control circuit in response to the ON/OFF of the LEDs and provides a dimming control signal for controlling the operation of the dimming control circuit.

9 Claims, 4 Drawing Sheets

POWER SUPPLY DEVICE FOR LED LIGHT

CROSS REFERENCE TO RELATED APPLICATION

This application claims priority under 35 U.S.C. §119 to Korean Patent Application No. 10-2015-0056087, filed Apr. 21, 2015, which is hereby incorporated by reference in its entirety.

TECHNICAL FIELD

The present invention relates to a power supply device for an LED light and, more particularly, to a device for controlling power of an apparatus, which provides lighting suitable for a user need by controlling an outdoor LED light.

BACKGROUND

A light-emitting diode (LED) is a kind of semiconductor device for converting electric energy into light. The LED has advantages of low consumption power, a semi-permanent lifespan, fast response speed, safety, and environment friendliness compared with an existing light source, such as a fluorescent lamp or an incandescent light. In particular, an LED light can perform various productions by controlling a flickering sequence, emitting color, and brightness of a plurality of arranged LEDs.

Active research is carried out on replacing an existing light source with an LED. The LED is the light source of a light, such as various indoor lamps, a liquid crystal display, an electric bulletin board, and a streetlamp, and the use of the LED tends to increase. In particular, the LED is used for a common light for an interior design, a stage light for producing a specific atmosphere, an advertising light, and a scene light.

A light device may be installed in the outer wall of a building, a park, a streetlamp, a bridge rail, or a theater as a scene light. The size and application system of the light device may be different depending on a use, object, or location to which the light device is applied. That is, light devices installed in the outer wall of a building are protruded from the outer wall of the building in a stripe form so that they perform a flickering function or display a single color or combined colors. Light devices installed in a park, a streetlamp, or a bridge rail are irregularly installed depending on the type of an object in such a way as to change flickering or colors. Furthermore, light devices installed in a theater are installed near or in the stage in a stripe form in such a way as to produce flickering or color so as to produce the magnificence of a theater. An outdoor light needs to be stably driven because it is difficult to maintain compared with an indoor light. Accordingly, various schemes for stably controlling an outdoor light are considered.

An LED light needs to be able to operate in standby mode in order to implement the LED light according to various purposes. Standby mode is a standby state in which although an LED is not turned on, it maintains a proper power level so that the LED can be driven anytime in response to a control signal from a power supply device for controlling the LED.

A conventional power supply device for an LED light has a single stage structure and a 2-stage structure. The 2-stage structure includes a separate circuit (i.e., a standby circuit) for implementing standby mode. The single stage structure has a simpler structure and smaller size than the 2-stage structure and does not include a standby circuit. The reason for this is that the single stage structure is not differentiated from the 2-stage structure if the standby circuit is inserted into the single stage structure, thereby increasing the size of the single stage structure. When an LED is turned on in the state in which a power supply device maintains a specific voltage without using a standby circuit, an overcurrent flows into the LED due to an instant voltage rise. As a result, there are problems in that a flash is generated from the LED and the lifespan of the LED is reduced due to the overcurrent.

BRIEF SUMMARY

The present invention has been made keeping in mind the above problems occurring in the prior art, and an object of the present invention is to provide a power supply device for an LED light, which has a single stage structure in which standby mode has been implemented. In particular, the present invention implements standby mode while maintaining the size of a power supply device for an LED light.

Another object of the present invention is to maintain standby mode in a power supply device for an LED light within a specific voltage range.

A power supply device for an LED light according to an embodiment of the present invention includes a power supply unit for converting input power and providing the converted power to LEDs and a central control unit for controlling an operation of the power supply unit. The power supply unit includes a switching circuit electrically connected to both ends of the LEDs, a switching control circuit configured to control the ON/OFF of the switching circuit, and a dimming control circuit configured to control the amount of power supplied by the power supply unit in response to the ON/OFF of the switching circuit and a dimming control signal received from the central control unit, and the central control unit provides a switching control signal for controlling the switching control circuit in response to the ON/OFF of the LEDs and provides a dimming control signal for controlling the operation of the dimming control circuit.

In another embodiment of the present invention, the power supply unit may further include a rectifier configured to convert input AC power into DC power and a converter circuit configured to control the amount of power received through the rectifier and provide the controlled power to the LEDs. The power supply unit may further include a filter configured to block the noise of the input AC power. The rectifier may convert the AC power having the noise blocked by the filter into the DC power. The power supply unit may further include a power factor compensation circuit configured to control the power factor of power received from the rectifier. The converter circuit may control the amount of the power having the power factor controlled by the power factor compensation circuit and supply the power having the controlled power factor to the LEDs.

In another embodiment of the present invention, the dimming control circuit may provide a signal for controlling the amount of the power to the converter circuit.

In the power supply device for an LED light according to another embodiment of the present invention, when the switching circuit is turned on, the switching circuit may provide the dimming control circuit with a signal proportional to the amount of a voltage at both ends of the LEDs. The dimming control circuit may compare the size of a signal received from the switching circuit with the size of the dimming control signal received from the central control unit, may generate a control signal based on a result of the comparison, and may provide the generated control signal to the power supply unit. In this case, the dimming control circuit may provide the power supply unit with a control signal proportional to a difference between the size of the signal received from the switching circuit and the size of the dimming control signal received from the central control unit as negative feedback.

In another embodiment of the present invention, when the switching circuit becomes ON, the central control unit may periodically change the size of the dimming control signal within a specific ratio or less of an LED rated voltage. More specifically, the specific ratio may be 5% of the LED rated voltage.

The switching circuit according to an embodiment of the present invention may have a switching element and a resistor element connected in series.

DETAILED DESCRIPTION

The detailed contents of a technical construction and acting effects thereof may be more evidently understood from the detailed description in conjunction with the accompanying drawings of the present invention.

Embodiments of the present invention are described in detail with reference to the accompanying drawings.

Figure 1:
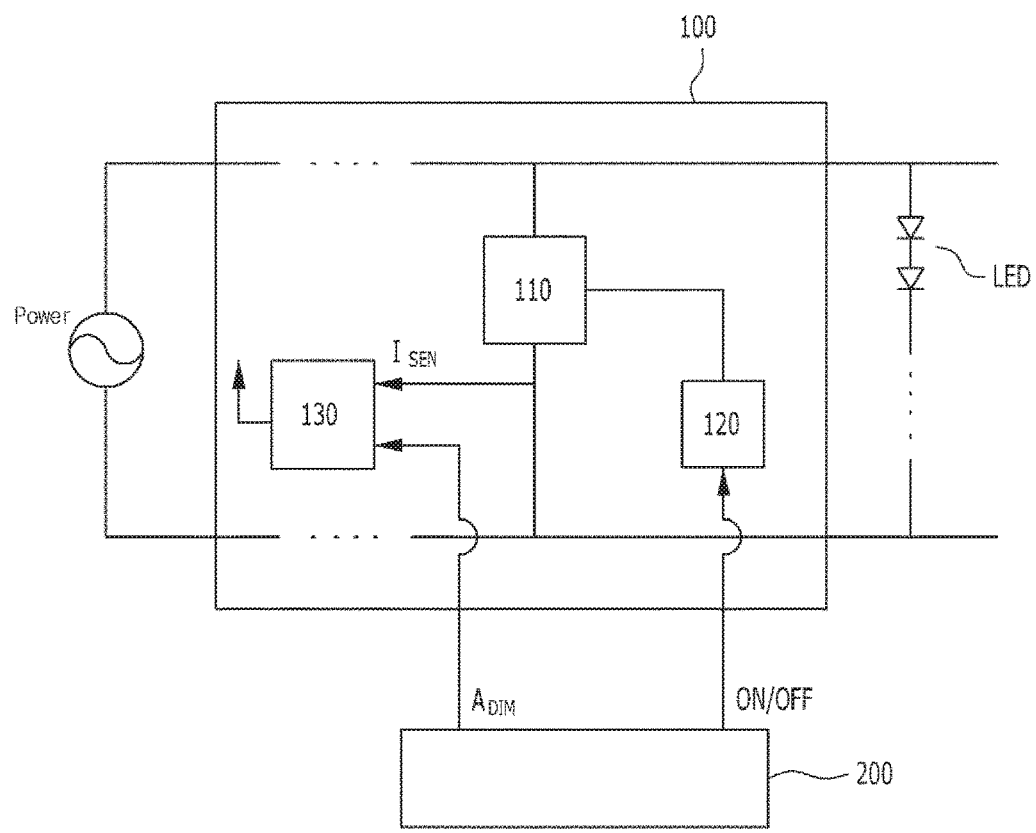
FIG. 1 is a block diagram showing the configuration of a power supply device for an LED light according to an embodiment of the present invention.

FIG. 1 is a block diagram showing the configuration of a power supply device for an LED light according to an embodiment of the present invention.

The power supply device for an LED light according to an embodiment of the present invention includes a power supply unit 100 for converting input power and supplying converted power to LEDs and a central control unit 200 for controlling the operation of the power supply unit 100. The power supply unit 100 is an element for converting external power into the range of rating power suitable for driving the LEDs.

The central control unit 200 according to an embodiment of the present invention is an element for controlling an overall operation of the power supply device for an LED light. The central control unit 200 executes various functions, such as whether the LEDs are driven or not, brightness, and communication with the outside, in response to a user input. In particular, the central control unit 200 functions to receive information about the operating state of each of elements within the power supply device and to generally control the operation of the power supply device by controlling each of the elements. The central control unit 200 may be implemented using a control device, such as a microcomputer. The power supply unit 100 operates in response to a control signal from the central control unit 200. As a result, the LEDs can operate in various ways.

In an embodiment of the present invention, the power supply unit 100 includes a switching circuit 110 electrically connected to both ends of the LEDs, a switching control circuit 120 configured to control the ON/OFF of the switching circuit 110, and a dimming control circuit 130 configured to control the amount of power supplied by the power supply unit 100 in response to the ON/OFF of the switching circuit 110 and a dimming control signal received from the central control unit 200.

An embodiment of the present invention can implement standby mode even in a power supply device for an LED light having the single stage structure through the aforementioned configuration. As described in "Description of the Related Art", there is a great difficulty in implementing standby mode while maintaining the size of a single stage. If the switching circuit 110, the switching control circuit 120, and the dimming control circuit 130 are configured and controlled, however, standby mode can be implemented through a simple configuration.

The switching circuit 110 is electrically connected to both ends of the LEDs. A switch included in the switching circuit 110 operates ON or OFF in response to a signal received from the switching control circuit 120. Other functions are not performed when the switch is OFF, but an operation according to a voltage at both ends of the LEDs is performed when the switch is ON. If current flowing through the switching circuit 110 is changed in response to a voltage at both ends of the LEDs and an operation of the switching circuit 110, the dimming control circuit 130 detects such a change and controls corresponding control. Accordingly, the power supply device operates in standby mode.

The switching control circuit 120 is an element for controlling the ON/OFF of the switching circuit 110. The switching control circuit 120 operates in response to a control signal from the central control unit 200. In lighting-up mode (i.e., the state in which the LEDs are turned on), the central control unit 200 supplies the LEDs with a voltage required to turn on the LEDs by controlling the elements of the power supply unit 100. A control signal for turning on the LEDs is also supplied to the switching control circuit 120. The switching control circuit 120 controls the switching circuit 110 contrary to the turn-on of the LEDs. That is, when the LEDs are turned on (i.e., when the central control unit 200 supplies a control signal for turning on the LEDs to the elements of the power supply unit 100 including the switching control circuit 120), the switching control circuit 120 controls the switching circuit 110 so that it becomes OFF. When the LEDs are turned off or operate in standby mode, the switching control circuit 120 controls the switching circuit 110 so that it becomes ON. As a result, only in the state in which the LEDs have been turned off, the switching circuit 110 may become ON and thus the LEDs may operate in standby mode.

The dimming control circuit 130 is an element for controlling the amount of power supplied by the power supply unit 100 in response to the ON/OFF of the switching circuit 110 and a dimming control signal received from the central control unit 200. The dimming control circuit 130 operates in response to the flickering of the LEDs.

First, when the LEDs are turned on (i.e., when the central control unit 200 supplies a control signal for turning on the LEDs to the elements of the power supply unit 100 including the switching control circuit 120), the dimming control circuit 130 receives a dimming control signal from the central control unit 200 and supplies the power supply unit 100 with a signal for controlling the intensity of light generated from the LEDs. For example, when a dimming control signal is inputted by the central control unit 200, a signal proportional to the dimming control signal (or the dimming control signal itself) may be inputted to the power supply unit 100 as negative feedback. If the size of a dimming control signal is increased in order to greatly reduce the intensity of light of the LEDs, the intensity of the LEDs may be reduced because negative feedback is generated in the power supply unit 100 in response to the increased dimming control signal. In contrast, if the size of the dimming control signal is reduced in order to slightly reduce the intensity of light of the LEDs, the intensity of the LEDs may be slightly reduced because the degree of negative feedback is reduced.

When the LEDs are turned off and operate in standby mode, the dimming control circuit 130 receives a signal generated when the switching circuit 110 becomes ON and receives a dimming control signal (this is a control signal for enabling the LEDs to operate in standby mode and has a size, period, or pattern from that of the dimming control signal when the LEDs are turned on) from the central control unit 200. The dimming control circuit 130 drives the power supply unit 100 based on a result of the comparison between the sizes of the received two signals, generates a control signal that does not turn on the LEDs, and supplies the generated control signal to the power supply unit 100.

A method in which the elements of the power supply device for an LED light according to an embodiment of the present invention operate so as to implement standby mode is described in detail below.

Figure 2:
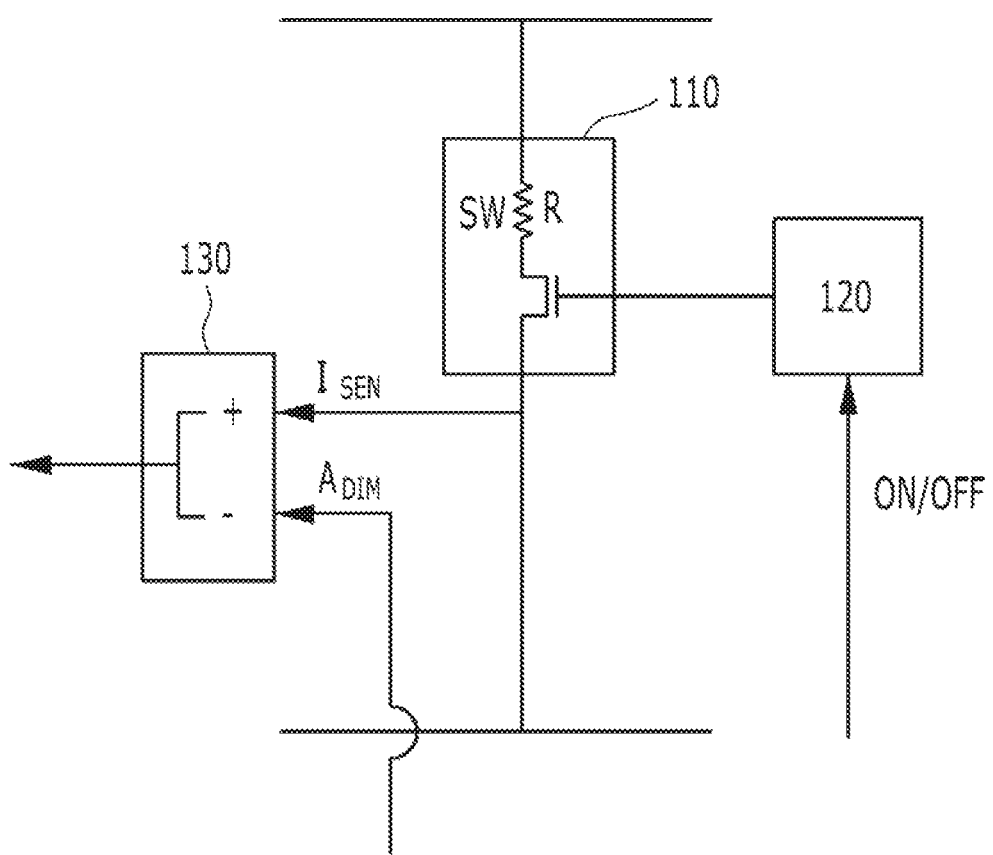
FIG. 2 is a block diagram showing an example of the power supply unit of the power supply device for an LED light.

FIG. 2 is an enlarged view of the switching circuit 110, the switching control circuit 120, and the dimming control circuit 130 in the power supply unit 100 within the power supply device for an LED light.

In standby mode, a signal for driving the LEDs from the central control unit 200 is OFF. When the signal is inputted to the switching control circuit 120, the switch of the switching circuit 110 becomes ON. At this time, a voltage corresponding to standby mode (i.e., a voltage that does not turn on the LEDs, but may drive the power supply device for an LED light) is applied across the switching circuit 110. The voltage generates current $I_{sen}$, through a resistor element included in the switching circuit 110. The current signal $I_{sen}$ is proportional to the amount of a voltage at both ends of the LEDs and inputted to the dimming control circuit 130. $I_{sen}$=0 because the switch of the switching circuit 110 is OFF in the state in which the LEDs have been turned on.

At this time, the dimming control circuit 130 receives a dimming control signal $A_{dim}$ from the central control unit 200. The dimming control circuit 130 may compare the size of the current signal $I_{sen}$ received from the switching circuit 110 with the size of the dimming control signal $A_{dim}$ received from the central control unit 200, may generate a control signal based on a result of the comparison, and may provide the generated signal to the power supply unit 100. The dimming control circuit 130 may be implemented using an amplifier for compare the size of the current signal $I_{sen}$ with the size of the dimming control signal $A_{dim}$ and outputting a signal proportional to a difference between the two signals, as shown in FIG. 2.

Brightness of the LEDs may be controlled in proportion to the dimming control signal $A_{dim}$ because the size of the current signal $I_{sen}$ is 0 in the state in which the LEDs have been turned on. In standby mode, however, a control signal proportional to a difference between the sizes of the dimming control signal $A_{dim}$ and the current signal $I_{sen}$ is provided to the power supply unit 100 as negative feedback because the current signal $I_{sen}$ is not 0. Accordingly, a voltage at both ends of the LEDs may be reduced because more negative feedback is performed according to an increase in the difference between the two signals (i.e., an increase of a voltage at both ends of the LEDs). When a voltage at both ends of the LEDs is reduced, the current signal $I_{sen}$ is reduced. If such negative feedback continues, a voltage at both ends of the LEDs may converge on a specific level.

Figure 3:
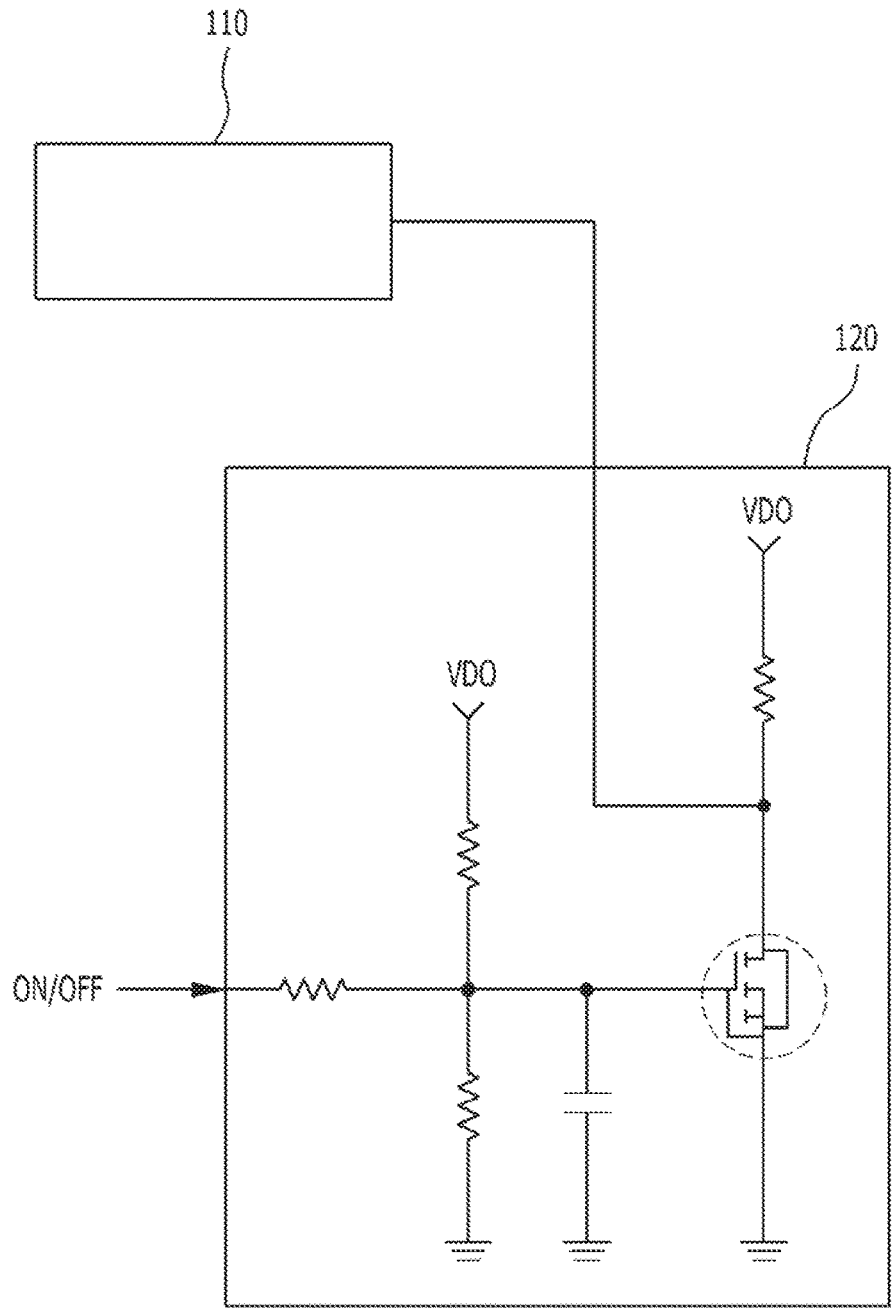
FIG. 3 is a circuit diagram showing an example in which a switching control circuit has been implemented according to an embodiment of the present invention.

FIG. 3 is a circuit diagram showing an example in which the switching control circuit 120 has been implemented according to an embodiment of the present invention. As shown in FIG. 3, output (i.e., a signal inputted to the switching circuit 110) is different in response to a control signal (ON/OFF) received from the central control unit 200. If the aforementioned operation can be executed, the switching control circuit 120 may be implemented using various circuits in addition to the circuit of FIG. 3.

In another embodiment of the present invention, in standby mode, the size of a dimming control signal may be periodically changed within a specific range. More specifically, when a switching signal is turned on, the central control unit 200 may periodically change the size of a dimming control signal within a specific ratio or less of a LED rated voltage. The change range may be determined to be a range in which both ends of the LEDs maintain a proper voltage range in standby mode. If the dimming control signal maintains a specific size, a voltage at both ends of the LEDs may be excessively higher or lower than a voltage for standby mode.

For example, if $A_{dim}$=0, the dimming control circuit 130 repeats negative feedback until the current signal $I_{sen}$ becomes 0 (i.e., $I_{sen}$=$A_{dim}$). In order for the current signal $I_{sen}$ to become 0, a voltage at both ends of the LEDs may be 0 or the switching circuit 110 may become OFF. If a voltage at both ends of the LEDs is 0, it no longer corresponds to standby mode, and the entire power supply device for an LED light becomes an OFF state. The switching circuit 110 becomes OFF when the LEDs are a turn-on state. As a result, when the dimming control signal $A_{dim}$ is 0 or lower, a voltage at both ends of the LEDs converges on a level much lower than a voltage for standby mode or the LEDs deviate from standby mode.

In contrast, if the dimming control signal $A_{dim}$ is high, the dimming control circuit 130 repeats negative feedback until the current signal $I_{sen}$ is equal to the dimming control signal $A_{dim}$. In the state in which the current signal $I_{sen}$ is high, the negative feedback is terminated and a voltage at both ends of the LEDs remains intact. However, a voltage at both ends of the LEDs may remain higher than standby mode because the current signal $I_{sen}$ is proportional to the voltage at both ends of the LEDs.

That is, in order to maintain a voltage at both ends of the LEDs within the range of standby mode, the power supply unit 100 may be designed by taking into consideration all of various variables, such as the size of a resistor included in the switching circuit 110, an amplification ratio of the dimming control circuit 130, and a negative feedback ration. To consider all the variables is not easy.

In order to solve such a problem, in an embodiment of the present invention, the size of a dimming control signal is periodically changed in standby mode (i.e., when the switching signal is ON). For example, if the size of a dimming control signal is periodically changed in a 10 unit from a 0 unit (the 10 unit is a specific size in which a voltage at both ends of the LEDs becomes higher than a proper level of standby mode), the degree of negative feedback increases as the size of the dimming control signal becomes the 0 unit, thereby decreasing a voltage at both ends of the LEDs. However, a voltage at both ends of the LEDs becomes higher than a proper level of standby mode as the size of the dimming control signal becomes close to the 10 unit. If such negative feedback by which a voltage at both ends of the LEDs becomes lower than a proper level of standby mode and such negative feedback by which a voltage at both ends of the LEDs becomes higher than a proper level of standby mode are periodically repeated, standby mode can be stably maintained because a voltage at both ends of the LEDs varies within a proper range of standby mode compared to the aforementioned embodiment. In an embodiment of the present invention, the dimming control signal can be periodically changed within the range of an LED rated voltage of 5%. It could be seen that the power supply device for an LED light stably maintains standby mode when the dimming control signal belongs to the range of an LED rated voltage of 5%. In this case, the range of an LED rated voltage may be differently set depending on the rated voltage of the LEDs, the size of a resistor included in the switching circuit 110, and an amplification ratio of the dimming control circuit 130.

Figure 4:
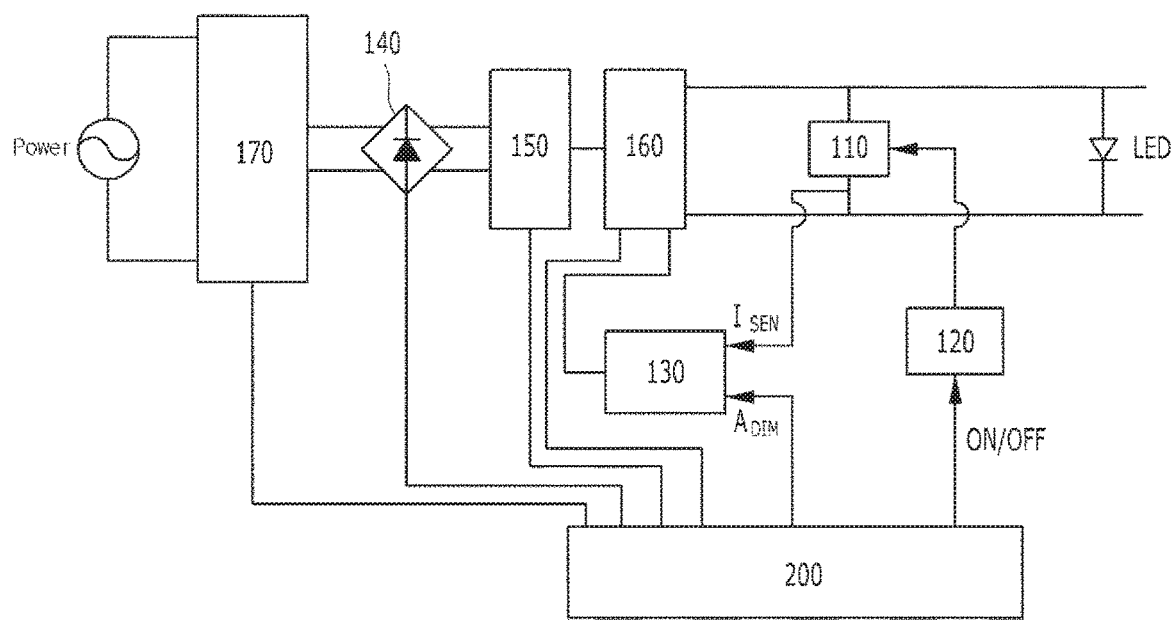
FIG. 4 is a circuit diagram showing a power supply device for an LED light according to another embodiment of the present invention.

FIG. 4 is a circuit diagram showing a power supply device for an LED light according to another embodiment of the present invention.

In the present embodiment, the power supply unit 100 may include a rectifier 140 for converting input AC power into DC power, a power factor compensation circuit 150 for controlling the power factor of power received from the rectifier 140, and a converter circuit 160 for controlling the amount of power received from the power factor compensation circuit 150 and supplying controlled power to LEDs.

The rectifier 140 according to an embodiment of the present invention is an element for converting AC power into DC power. An LED light is driven by DC power, but commercial power is AC power and thus needs to be converted into DC power. To this end, in an embodiment of the present invention, the power supply unit 100 includes the rectifier 140. The rectifier 140 according to an embodiment of the present invention may be implemented using various types of rectification elements, such as a half-bridge rectifier and a full-bridge rectifier.

The power factor compensation circuit 150 according to an embodiment of the present invention is an element for improving input versus output efficiency by improving the power factor of the entire circuit and also an element for transferring an insulated voltage to the LEDs. The power factor compensation circuit 150 according to an embodiment of the present invention may be implemented using a fly-back circuit, but is not limited thereto. For example, an element having the same function may be construed as being included in the power factor compensation circuit 150.

The converter circuit 160 is an element for controlling power supplied to the LEDs via the power factor compensation circuit 150 in response to a signal received from the central control unit 200. The amount of power supplied to the LEDs via the power factor compensation circuit 150 may be greater than or smaller than power for driving the LEDs (in general, greater than or smaller than power for driving the LEDs). The scale of the amount of power supplied to the LEDs is controlled, for example, converted into power suitable for driving the LEDs through DC-DC conversion, and the converted power is supplied to the LEDs. Furthermore, whether the LEDs are driven or not and the brightness and driving time of the LEDs are controlled in response to a signal from the central control unit 200.

In another embodiment of the present invention, the power supply unit 100 may further include a filter 170 for blocking noise from input AC power. In this case, the rectifier 140 may convert AC power whose noise has been blocked by the filter 170 into DC power.

The filter 170 is an element for blocking noise included in external input power (i.e., commercial power is AC power). The power supply device for an LED light according to an embodiment of the present invention controls various operations, such as the ON/OFF of the LEDs, using commercial AC power. The LEDs are driven by DC power. That is, AC power needs to be converted into DC power. Prior to such power conversion, noise having various components included in the AC power is removed from the AC power so that the AC power is efficiently converted into DC power. Furthermore, parts of the power supply device can be prevented from being damaged by a noise signal because various noises transferred from a system are prevented from being introduced into the power supply device for an LED light.

The dimming control circuit 130 described in connection with the various embodiments provides a control signal to the power supply unit 100, in particular, the converter circuit 160. The converter circuit 160 may control the amount of power supplied to the LEDs by controlling the conversion ratio of power in response to the control signal received from the dimming control circuit 130.

In accordance with an embodiment of the present invention, standby mode can stably operate even in a single stage structure by inserting a small circuit without configuring a separate standby circuit. Accordingly, the size of a power supply device for an LED light can be reduced.

Furthermore, in standby mode, the power supply device for an LED light can operate in a proper voltage range.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power supply device for an LED light, comprising:
   a power supply unit for converting input power and providing the converted power to LEDs; and
   a central control unit for controlling an operation of the power supply unit,
   wherein the power supply unit comprises:
   a switching circuit electrically connected to both ends of the LEDs;
   a switching control circuit configured to control an ON/OFF of the switching circuit; and
   a dimming control circuit configured to control an amount of power supplied by the power supply unit in response to the ON/OFF of the switching circuit and a dimming control signal received from the central control unit;
   wherein the central control unit provides a switching control signal for controlling the switching control circuit in response to the ON/OFF of the switching circuit and provides the dimming control signal for controlling an operation of the dimming control circuit, and
   wherein when the switching circuit becomes ON, the central control unit periodically changes a size of the dimming control signal within a specific ratio or less of an LED rated voltage.

2. The power supply device of claim 1, wherein the power supply unit further comprises:
   a rectifier configured to convert input AC power into DC power; and a converter circuit configured to control an amount of power received through the rectifier and provide the controlled power to the LEDs.

3. The power supply device of claim 2, wherein:
the power supply unit further comprises a filter configured to block noise of the input AC power, and
the rectifier converts the AC power having the noise blocked by the filter into the DC power.

4. The power supply device of claim 2, wherein:
the power supply unit further comprises a power factor compensation circuit configured to control a power factor of power received from the rectifier, and
the converter circuit controls the amount of the power having the power factor controlled by the power factor compensation circuit and supplies the power having the controlled power factor to the LEDs.

5. The power supply device of claim 2, wherein the dimming control circuit provides a signal for controlling the amount of the power to the converter circuit.

6. The power supply device of claim 1, wherein:
when the switching circuit is turned on, the switching circuit provides the dimming control circuit with a signal proportional to an amount of a voltage at both ends of the LEDs, and
the dimming control circuit compares a size of a signal received from the switching circuit with a size of the dimming control signal received from the central control unit, generates a control signal based on a result of the comparison, and provides the generated control signal to the power supply unit.

7. The power supply device of claim 1, wherein the specific ratio is 5% of the LED rated voltage.

8. The power supply device of claim 1, wherein the switching circuit has a switching element and a resistor element connected in series.

9. A power supply device for an LED light, comprising:
a power supply unit for converting input power and providing the converted power to LEDs; and
a central control unit for controlling an operation of the power supply unit,
wherein the power supply unit comprises:
a switching circuit electrically connected to both ends of the LEDs;
a switching control circuit configured to control an ON/OFF of the switching circuit; and
a dimming control circuit configured to control an amount of power supplied by the power supply unit in response to the ON/OFF of the switching circuit and a dimming control signal received from the central control unit;
wherein the central control unit provides a switching control signal for controlling the switching control circuit in response to the ON/OFF of the switching circuit and provides the dimming control signal for controlling an operation of the dimming control circuit;
wherein, when the switching circuit is turned on, the switching circuit provides the dimming control circuit with a signal proportional to an amount of a voltage at both ends of the LEDs, and the dimming control circuit compares a size of a signal received from the switching circuit with a size of the dimming control signal received from the central control unit, generates a control signal based on a result of the comparison, and provides the generated control signal to the power supply unit; and
wherein the dimming control circuit provides the power supply unit with a control signal proportional to a difference between the size of the signal received from the switching circuit and the size of the dimming control signal received from the central control unit as negative feedback.

* * * * *